(12) United States Patent
Maidl et al.

(10) Patent No.: US 9,457,499 B2
(45) Date of Patent: Oct. 4, 2016

(54) PARTICLE FOAM COMPONENT HAVING A TEXTURED SURFACE AND METHOD AND MOLD FOR THE MANUFACTURE THEREOF

(71) Applicant: HERMAN MILLER, INC., Zeeland, MI (US)

(72) Inventors: Janja Maidl, Berlin (DE); Claudia Plikat, Berlin (DE); Johann Burkhard Schmitz, Berlin (DE); Roland Rolf Otto Zwick, Berlin (DE); Carola Eva Marianne Zwick, Berlin (DE)

(73) Assignee: Herman Miller, Inc., Zeeland, MI (US)

( * ) Notice: Subject to any disclaimer, the term of this patent is extended or adjusted under 35 U.S.C. 154(b) by 0 days.

(21) Appl. No.: 14/211,029

(22) Filed: Mar. 14, 2014

(65) Prior Publication Data

US 2014/0370239 A1    Dec. 18, 2014

Related U.S. Application Data

(60) Provisional application No. 61/791,781, filed on Mar. 15, 2013.

(51) Int. Cl.
*B29C 44/02*        (2006.01)
*C08J 9/232*        (2006.01)
(Continued)

(52) U.S. Cl.
CPC .............. *B29C 44/02* (2013.01); *B29C 33/10* (2013.01); *B29C 33/424* (2013.01); *B29C 33/44* (2013.01); *B29C 44/445* (2013.01); *C08J 9/232* (2013.01); *B29C 33/442* (2013.01);
(Continued)

(58) Field of Classification Search
CPC ..... B29C 44/02; B29C 44/445; B29C 33/44; B29C 33/424; B29C 33/10; B29C 33/442; C08J 9/232; C08J 2323/12; B29K 2995/0002; B29K 2995/0072; B29K 2995/0015; B29K 2023/12; Y10T 428/24355
USPC ........ 428/141–150; 249/141; 216/52; 264/49
See application file for complete search history.

(56) References Cited

U.S. PATENT DOCUMENTS 2,933,768 A    4/1960 Morris
3,251,911 A    5/1966 Hansen
(Continued)

FOREIGN PATENT DOCUMENTS

EP    477476 A2    4/1992
EP    491300 A3    6/1992
(Continued)

OTHER PUBLICATIONS

International Search Report and Written Opinion of the International Searching Authority issued in PCT Patent Application No. PCT/US14/26286, mailed Jul. 7, 2014, 17 pages.
(Continued)

*Primary Examiner* — Nathan Van Sell
(74) *Attorney, Agent, or Firm* — Michael Best & Friedrich LLP

(57) ABSTRACT

An element molded from a particle foam, including for example expanded polypropylene foam, includes at least one visible exterior surface defined by the particle foam. The visible exterior surface is textured having a roughness depth of less than or equal to 1.00 mm and a plurality of vent interfaces each having a maximum width of less than or equal to 0.4 mm. Methods of molding the element, together with a mold and a method of making the mold, are also provided.

20 Claims, 19 Drawing Sheets

(51) Int. Cl.
*B29C 33/10* (2006.01)
*B29C 33/42* (2006.01)
*B29C 33/44* (2006.01)
*B29C 44/44* (2006.01)
*B29K 23/00* (2006.01)

(52) U.S. Cl.
CPC .. *B29K 2023/12* (2013.01); *B29K 2995/0002* (2013.01); *B29K 2995/0015* (2013.01); *B29K 2995/0072* (2013.01); *C08J 2323/12* (2013.01); *Y10T 428/24355* (2015.01)

(56) References Cited

U.S. PATENT DOCUMENTS

| | | | |
|---|---|---|---|
| 3,705,222 A | 12/1972 | Rogers et al. | |
| 3,764,642 A | 10/1973 | Boutillier | |
| 3,802,815 A | 4/1974 | Buchmann | |
| 3,886,250 A | 5/1975 | Danko | |
| 3,889,919 A | 6/1975 | Ladney, Jr. | |
| 3,931,378 A | 1/1976 | Goehring | |
| RE28,826 E | 5/1976 | Ladney, Jr. et al. | |
| 4,043,721 A | 8/1977 | Lemelson | |
| 4,081,225 A | 3/1978 | Yaita | |
| 4,359,443 A | 11/1982 | Michaels | |
| 4,609,519 A | 9/1986 | Pichard et al. | |
| 4,698,191 A | 10/1987 | Endo et al. | |
| 4,720,509 A | 1/1988 | Nakamura | |
| 4,777,000 A | 10/1988 | Kuwabara et al. | |
| 4,781,569 A | 11/1988 | Kinugasa et al. | |
| 4,812,484 A | 3/1989 | Endo et al. | |
| 4,830,798 A | 5/1989 | Maeda | |
| 4,882,361 A | 11/1989 | Ruckes et al. | |
| 4,999,152 A | 3/1991 | Baldwin et al. | |
| 5,021,203 A | 6/1991 | Larsson et al. | |
| 5,034,178 A | 7/1991 | Kinugasa et al. | |
| 5,085,814 A | 2/1992 | Kamiyama et al. | |
| 5,094,603 A | 3/1992 | Gellert | |
| 5,252,617 A | 10/1993 | Werner et al. | |
| 5,261,984 A | 11/1993 | Minnick et al. | |
| 5,324,753 A | 6/1994 | Lesca et al. | |
| 5,474,841 A | 12/1995 | Matsuki et al. | |
| 5,476,618 A | 12/1995 | Ito et al. | |
| 5,651,912 A | 7/1997 | Mitsumoto et al. | |
| 5,786,394 A | 7/1998 | Slaven | |
| 5,800,771 A | 9/1998 | Ohno | |
| 5,858,288 A | 1/1999 | Bullard | |
| 5,935,620 A | 8/1999 | Baudin | |
| 6,033,770 A | 3/2000 | Matsuki et al. | |
| 6,096,417 A | 8/2000 | Shioya et al. | |
| 6,130,266 A | 10/2000 | Mihayashi et al. | |
| 6,261,489 B1 | 7/2001 | Matsuki et al. | |
| 6,490,829 B1 * | 12/2002 | Schreiner et al. | 52/36.1 |
| 6,500,368 B1 | 12/2002 | Sameshima et al. | |
| 6,558,592 B1 | 5/2003 | Nohara et al. | |
| 6,565,958 B1 | 5/2003 | Weder | |
| 6,589,470 B2 | 7/2003 | Fried et al. | |
| 6,593,383 B2 | 7/2003 | Yanagihara et al. | |
| 6,607,682 B1 | 8/2003 | Yamaguchi et al. | |
| 6,613,266 B2 | 9/2003 | McDonald | |
| 6,660,195 B2 | 12/2003 | Usui et al. | |
| 6,701,678 B1 * | 3/2004 | Skov | A47F 5/0815 403/326 |
| 6,749,794 B2 | 6/2004 | Spengler | |
| 6,749,795 B2 | 6/2004 | Murphy | |
| 6,800,227 B1 | 10/2004 | Nohara et al. | |
| 6,863,849 B2 | 3/2005 | Nohara et al. | |
| 6,884,823 B1 | 4/2005 | Pierick et al. | |
| 6,984,445 B1 | 1/2006 | Yamagata et al. | |
| 7,014,801 B2 | 3/2006 | Imanari et al. | |
| 7,070,720 B2 | 7/2006 | Nohara et al. | |
| RE39,339 E | 10/2006 | Andersen et al. | |
| 7,300,698 B2 | 11/2007 | Monaci | |
| 7,578,668 B2 | 8/2009 | Hutchinson et al. | |
| 7,581,769 B2 | 9/2009 | Wakabayashi et al. | |
| 7,662,468 B2 | 2/2010 | Bainbridge | |
| 7,887,315 B2 | 2/2011 | Lane | |
| 7,934,693 B2 | 5/2011 | Bravinski | |
| 7,976,298 B2 | 7/2011 | Buckle et al. | |
| 8,043,539 B2 | 10/2011 | Ozasa et al. | |
| 8,043,542 B2 | 10/2011 | Pfeiffer et al. | |
| 8,084,509 B2 | 12/2011 | Shibata et al. | |
| 8,088,835 B2 | 1/2012 | Iwamoto et al. | |
| 8,117,679 B2 | 2/2012 | Pierce | |
| 8,129,177 B2 | 3/2012 | Cohn | |
| 8,137,600 B2 | 3/2012 | Pierick et al. | |
| 8,222,310 B2 | 7/2012 | Itadani et al. | |
| 9,010,034 B2 * | 4/2015 | Plikat et al. | 52/36.5 |
| 2002/0136848 A1 | 9/2002 | Yoshii et al. | |
| 2004/0069924 A1 | 4/2004 | Lemieux et al. | |
| 2004/0222566 A1 | 11/2004 | Park | |
| 2005/0028454 A1 * | 2/2005 | Steed et al. | 52/36.1 |
| 2006/0163764 A1 | 7/2006 | Hanada et al. | |
| 2006/0163765 A1 | 7/2006 | Hanada et al. | |
| 2008/0272510 A1 | 11/2008 | Buckle et al. | |
| 2009/0056249 A1 * | 3/2009 | Premislav et al. | 52/220.7 |
| 2009/0062427 A1 | 3/2009 | Tornow et al. | |
| 2010/0175332 A1 * | 7/2010 | Henriott | 52/36.6 |
| 2010/0175850 A1 | 7/2010 | Kaucic et al. | |
| 2010/0187710 A1 | 7/2010 | Tanaka | |
| 2011/0048963 A1 | 3/2011 | Shimizu et al. | |
| 2011/0081516 A1 | 4/2011 | Stillwell et al. | |
| 2012/0100376 A1 | 4/2012 | Sakaguchi et al. | |
| 2012/0177716 A1 | 7/2012 | Ho et al. | |
| 2014/0243442 A1 * | 8/2014 | Coles et al. | 521/143 |

FOREIGN PATENT DOCUMENTS

| | | | | |
|---|---|---|---|---|
| EP | 0309840 B1 | 7/1992 | | |
| EP | 434024 B1 | 3/1995 | | |
| EP | 0720528 A1 | 7/1996 | | |
| EP | 0720528 B1 | 3/1999 | | |
| EP | 1182023 A1 | 2/2002 | | |
| EP | 1182023 B1 | 2/2005 | | |
| WO | WO 95/08433 A1 | 3/1995 | | |
| WO | WO 2008019458 A1 * | 2/2008 | | C08J 9/12 |
| WO | WO 2010/079212 A2 | 7/2010 | | |
| WO | WO 2011029431 A1 * | 3/2011 | | E04B 2/74 |
| WO | WO 2012044878 A2 | 4/2012 | | |

OTHER PUBLICATIONS

NatureMill NEO, NatureMille Automatic Composter, http://naturemill.com/composter.html, Aug. 24, 2012, 1 pages.

* cited by examiner

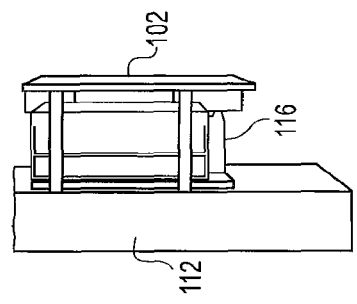
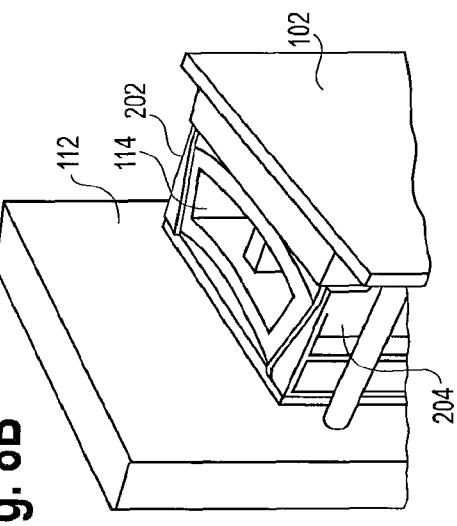
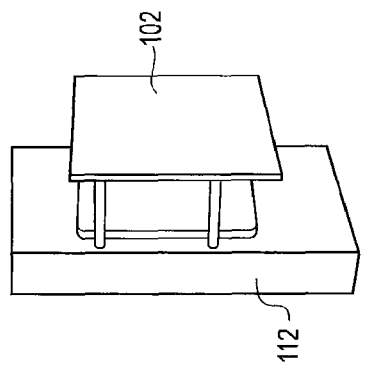
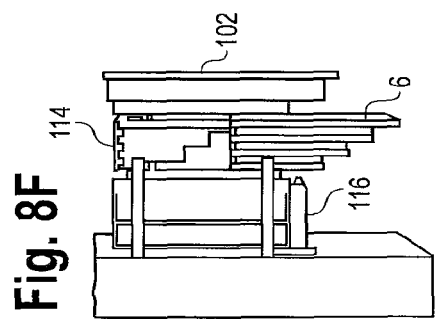
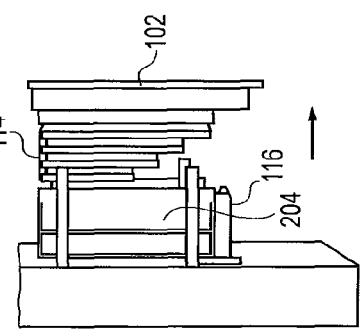
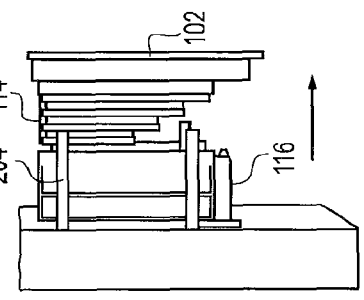

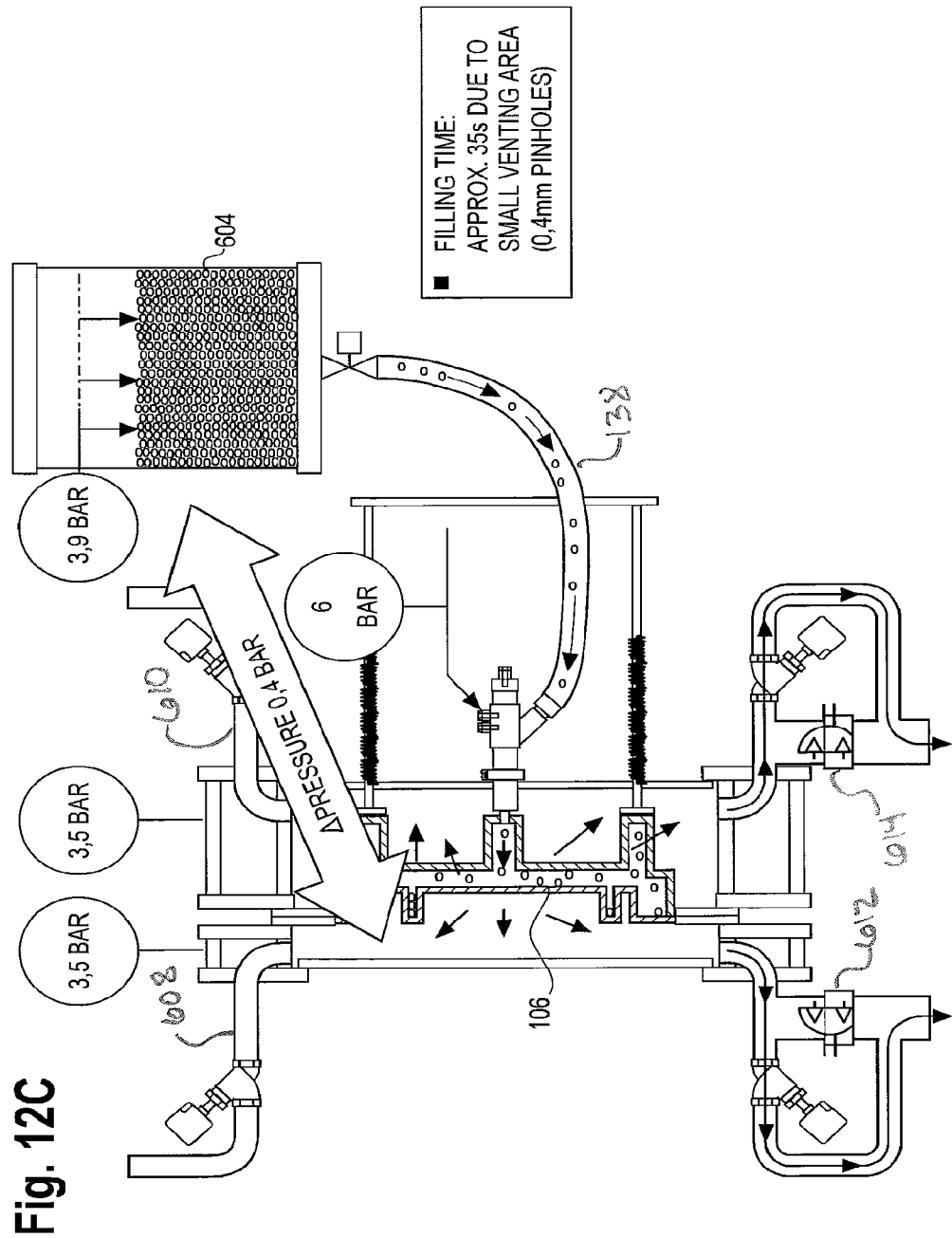

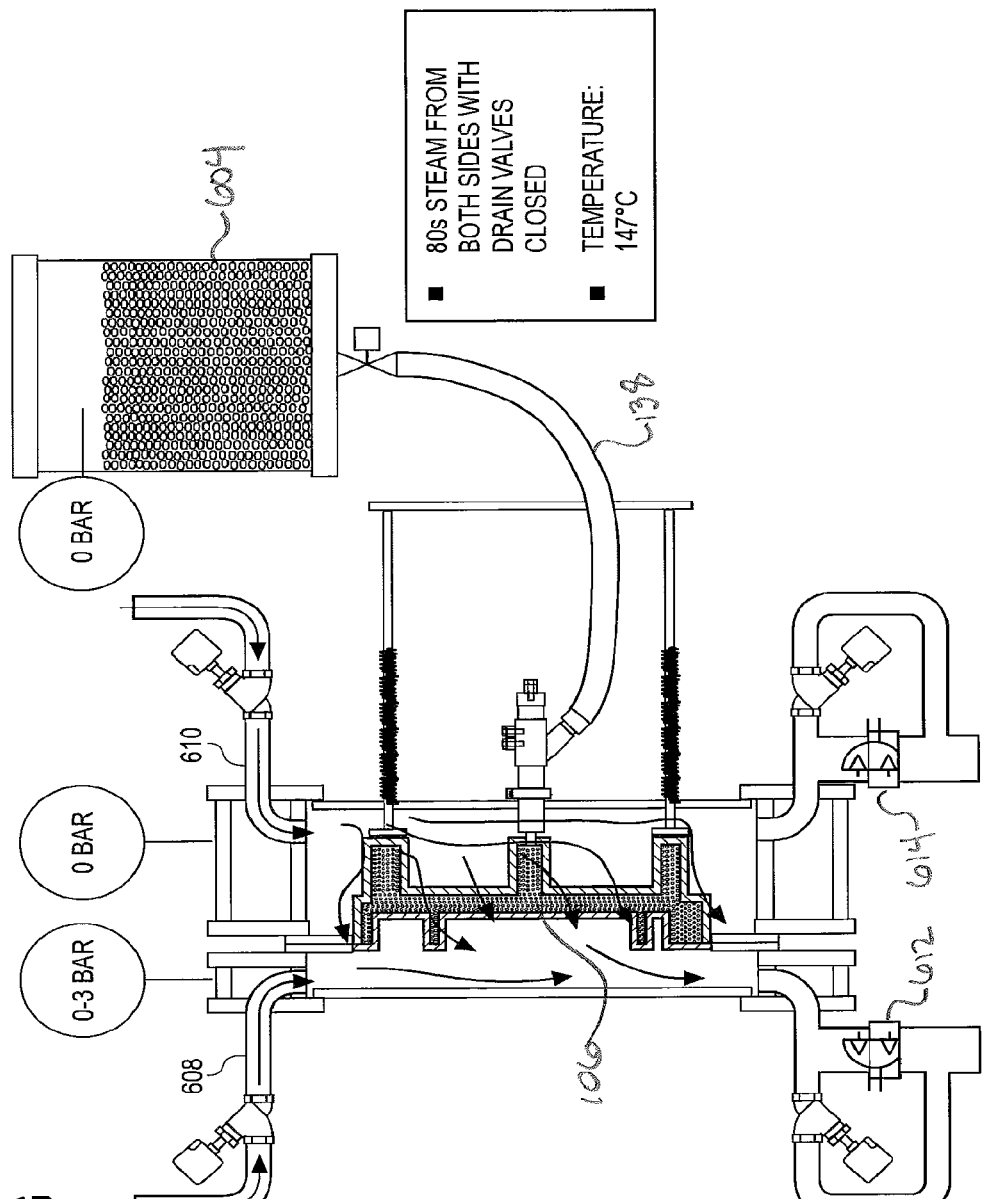

PARTICLE FOAM COMPONENT HAVING A TEXTURED SURFACE AND METHOD AND MOLD FOR THE MANUFACTURE THEREOF

This application claims the benefit of U.S. Provisional Application No. 61/791,781, filed Mar. 15, 2013, the entire disclosure of which is hereby incorporated herein by reference.

TECHNICAL FIELD

The present invention relates generally to a particle foam component, including for example an expanded polypropylene (EPP) foam component, such as a partition, having a textured class-A surface that is visually pleasing, and to various methods and molds for the manufacture thereof.

BACKGROUND

Various reconfigurable partition and workspace systems are well known. Typically, such systems define predetermined, fixed workspace footprints that are not variable, but rather are defined by the length of individual wall units incorporated into the system. As such, these types of systems are not easily reconfigurable to accommodate different, individual spatial and functional needs of the users. In addition, such systems are often closed or provide relative high barriers, which may inhibit collaboration and communication between adjacent co-workers.

In addition, conventional systems typically are one-sided, with storage, worksurfaces and/or other accessories mounted and/or made accessible from only one side of wall unit. As such, the systems make lack the ability to promote team building and collaboration across the partition. Moreover, such systems typically require extensive assembly and disassembly time and are relatively heavy, thereby limiting the portability and reconfigurability of the system. Furthermore, such systems may require a large variety of individual parts and connectors, which may be easily misplaced.

Separate and apart from known partition systems, it is known to mold components from EPP. Typically, such components may not have a surface finish suitable for consumer, such as in the office, home or vehicle environment, thereby requiring additional treatment or covering of such a surface. Moreover, it may be difficult to achieve a suitable appearance on more than one side of a component or on relatively large components, due to various tooling limitations.

SUMMARY

Briefly stated, in one aspect, one embodiment of a molded component includes an element molded from a particle foam, including for example and without limitation expanded polypropylene foam. The element includes at least one visible exterior surface defined by the particle foam. The visible exterior surface is textured having a roughness depth of less than or equal to 1.0 mm, and in one embodiment less than or equal to 0.5 mm, and a plurality of vent interfaces each having a maximum width of less than or equal to 0.4 mm. In one embodiment, the plurality of vent interfaces are distributed with a density of one vent interface per 100 mm$^2$ of surface area or less.

In another aspect, one embodiment of a method of molding a component includes introducing beads of a particle foam, including for example and without limitation expanded polypropylene foam, into a mold interior, wherein the mold includes at least one textured molding surface defining at least in part the mold interior. The molding surface has a roughness depth of less than or equal to 0.5 mm and a plurality of vents each having a maximum width of less than or equal to 0.4 mm. The method further includes introducing steam into the mold interior through the plurality of vents for a predetermined period of time, fusing the beads of particle foam with the steam and thereby forming a molded element, and removing the molded element from the mold.

In yet another aspect, a mold for molding particle foam, including for example and without limitation expanded polypropylene foam, includes at least one mold component defining at least in part a mold interior. The mold component includes at least one textured molding surface defining at least in part the mold interior, wherein the textured molding surface has a roughness depth of less than or equal to 0.5 mm and a plurality of vents each having a maximum width of less than or equal to 0.4 mm.

In yet another aspect, one embodiment of a method of making a mold for molding a particle foam, including for example and without limitation expanded polypropylene foam, includes providing at least one mold component defining at least one molding surface, and treating the molding surface such that the molding surface includes a roughness depth of less than or equal to 0.5 mm. In one embodiment, the treating of the molding surface includes etching the molding surface. In one embodiment, the method further includes drilling vents through the mold component. The vents communicate with the molding surface. The vents have a maximum width of less than or equal to 0.4 mm.

The various aspects and embodiments provide significant advantages over other partition and workspace systems. For example and without limitation, the molded component has a premium class-A finish suitable for direct interface with end users. In addition, the component may be made relatively large, and be provided with a premium finish on more than one side.

The present embodiments of the invention, together with further objects and advantages, will be best understood by reference to the following detailed description taken in conjunction with the accompanying drawings.

BRIEF DESCRIPTION OF THE DRAWINGS

FIGS. 8A-F show different phases of the ejection of a mold component from a mold.

FIGS. 12A-L are schematic diagrams of the mold assembly corresponding to the molding steps of FIG. 11.

DETAILED DESCRIPTION OF THE PRESENTLY PREFERRED EMBODIMENTS

The terms "longitudinal" and "axial" as used herein relates to a length or lengthwise direction, including for example a lengthwise direction of a partition or mold component, and may include both a horizontal and vertical direction notwithstanding that those directions are substantially perpendicular respectively. The term "lateral" and variations thereof refer to a sideways direction. The terms "top," "upper," "bottom" and "lower" are intended to indicate directions when viewing the partition when positioned for use. It should be understood that the term "plurality," as used herein, means two or more. The term "coupled" means connected to or engaged with, whether directly or indirectly, for example with an intervening member, and does not require the engagement to be fixed or permanent, although it may be fixed or permanent. The term "transverse" means extending across an axis, including without limitation substantially perpendicular to an axis. It should be understood that the use of numerical terms "first," "second," "third," etc., as used herein does not refer to any particular sequence or order of components; for example "first" and "second" portions may refer to any sequence of such portions, and is not limited to the first and second portions of a particular configuration unless otherwise specified. The term "plurality" means two or more, or more than one.

Molded Component

Figure 1:
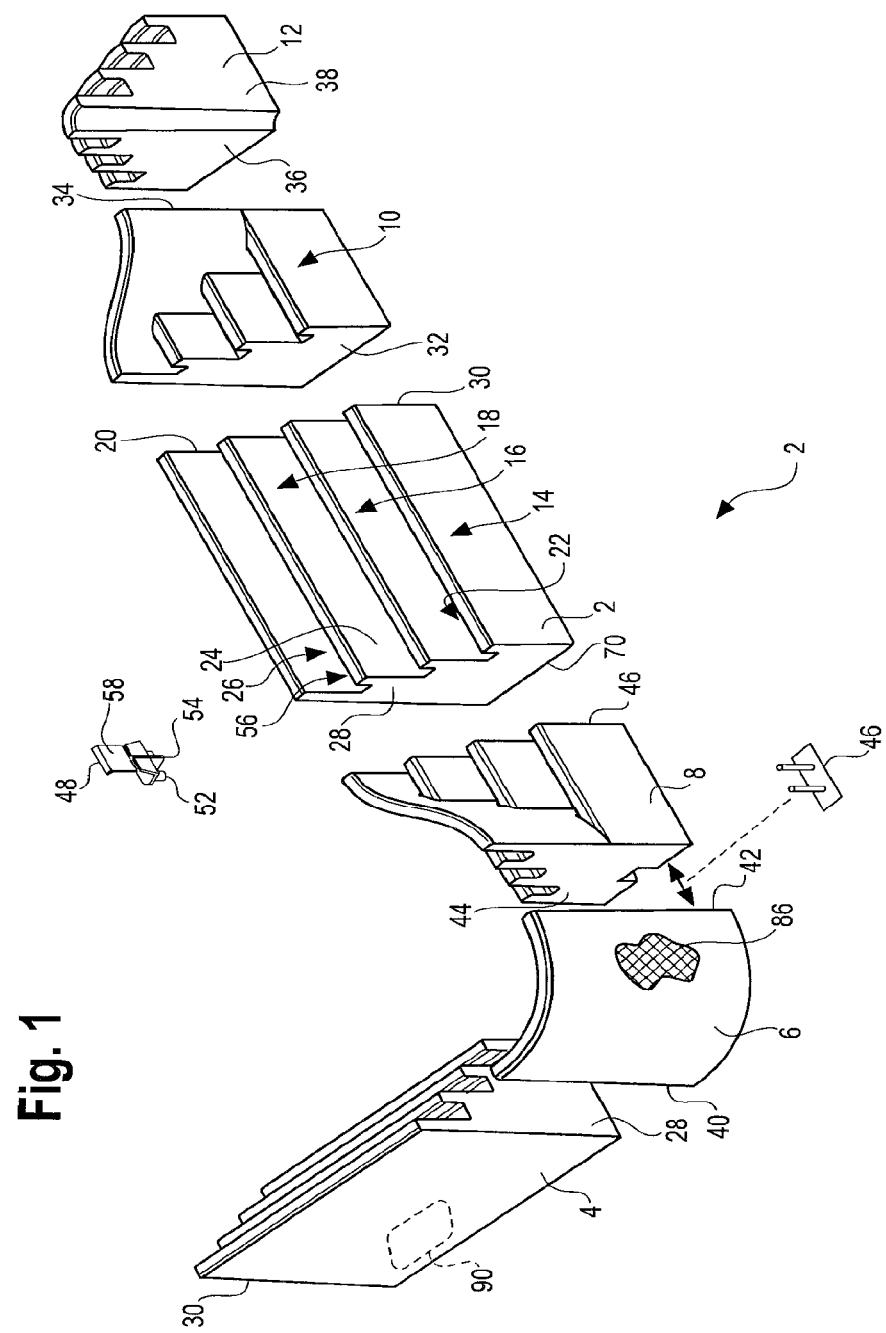
FIG. 1 is an exploded perspective view of a partition system.
Figure 2:
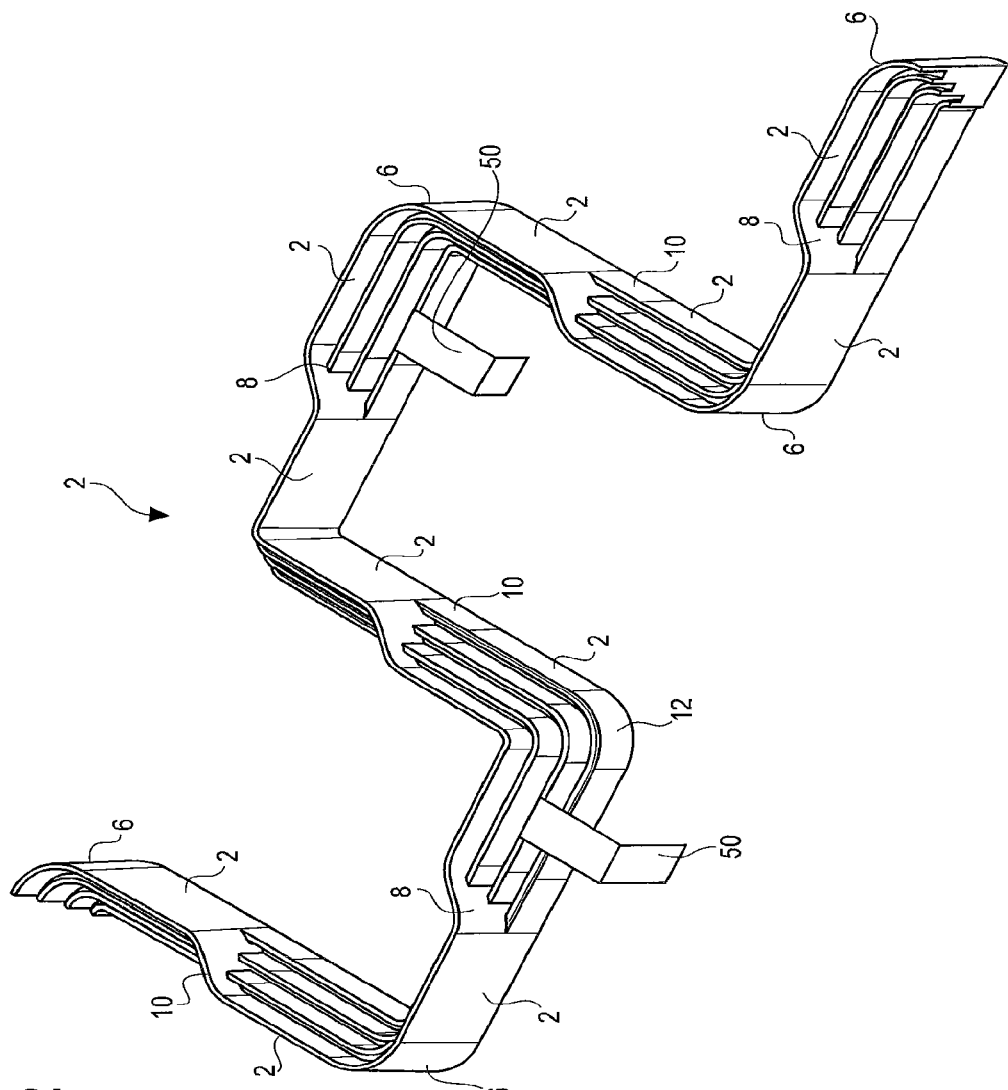
FIG. 2 is a perspective view of a partition system.

Referring to FIGS. 1 and 2, a partition system 2 is configured with a plurality of wall elements 4, 6, 8, 10, 12 which may be arranged end-to-end in various configurations. The wall elements may be curved or linear elements 4, 6 or combinations thereof, and may include various transition and corner elements 6, 8, 10, 12. In one embodiment, the wall elements 4, 6, 8, 10, 12 are configured as stepped element, which defines a plurality of walls 14, 16, 18, 20 arranged at different heights, and a plurality of channels 22, 24, 26 arranged at different heights. Each of the walls 14, 16, 18, 20 has an opposite side walls having a width (WW) and an upper support surface. Likewise, each of the channels 22, 24, 26 has a bottom and opposite side walls defining a width (CW) of the channel. Pairs of walls 14, 16, 18, 20 define the channels 22, 24, 26 therebetween, with the sidewalls of spaced apart walls corresponding to the sidewalls of the channel formed therebetween. In one embodiment, the wall elements are configured with four walls and three channels, although it should be understood that more or less walls and channels may be used. In various embodiments, the heights HW1, HW2, HW3, and HW4 of the walls 20, 18, 16, 14 are 42 inches, 35.5 inches, 29.00 inches and 22.5 inches respectively in one embodiment, and 41.625 inches, 35.312 inches, 29.00 inches and 22.69 inches respectively in another embodiment, while the height of the bottom of the channels HC1, HC2 and HC3 are 31.16 inches, 24.85 inches and 18.54 inches respectively, although other heights may be suitable. The walls, when configured with a worksurface component 50 secured thereto, provide a worksurface at a counter height, a kitchen counter height, a work table height and a continental table height respectively. The depth of the channels (height of front wall to bottom of channel) may be calculated, and is about 4.5 inches in one embodiment. In addition, the walls may have linear sides as shown, or may be tapered. The width (CW) of the channels 22, 24, 26 is 2.00 inches, and preferably between 1 and 10 inches, while the width (WW) of the walls 14, 16, 18, 20 is also 2.00 inches, and preferably between 1 and 10 inches. It should be understood that other heights and widths may be suitable. Preferably, the widths of the walls are the same such that they are suited to support similar components, but varying widths may be employed. Likewise, the widths of the channels are the same to support similarly shaped and dimensioned components, but the widths may vary as deemed appropriate.

Figure 3:
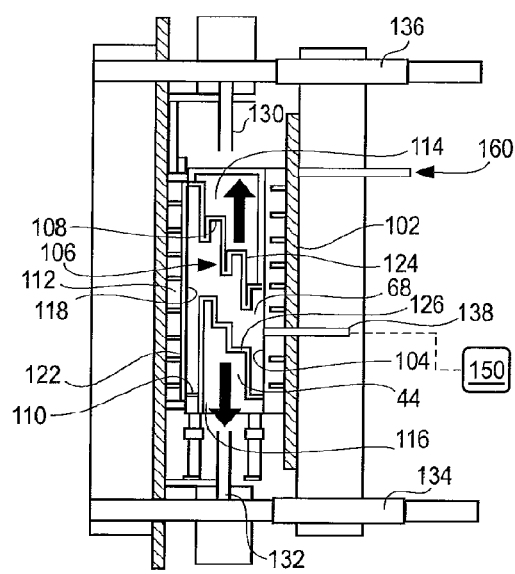
FIG. 3 is a cross-sectional view of a mold.
Figure 4:
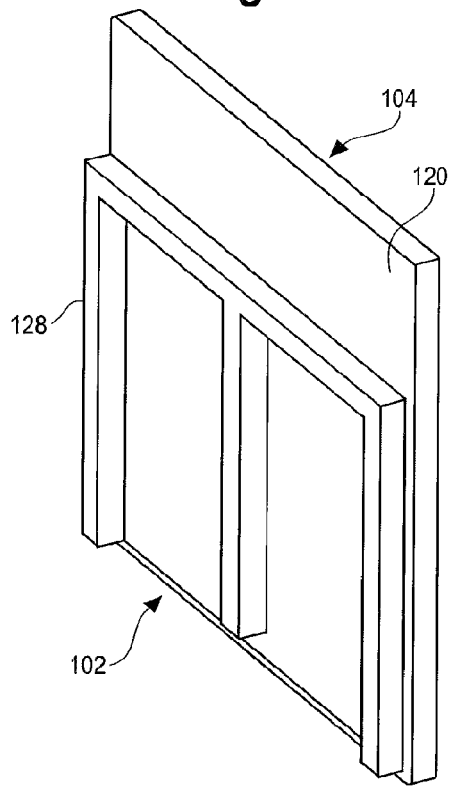
FIG. 4 is a perspective view of a mold element.
Figure 5:
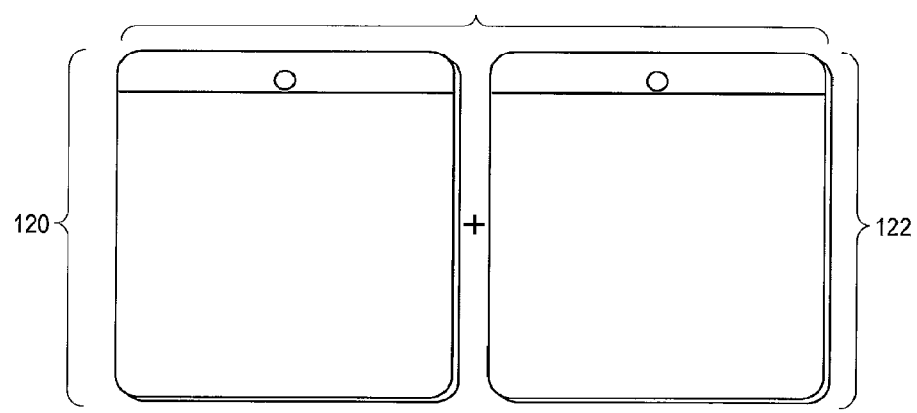
FIG. 5 is view of two film etching finishes.

The wall elements 4, 6, 8, 10 have opposite end surfaces 28, 30, 32, 34, 36, 38, 40, 42 defining a length of the respective wall elements, and which are abutted during assembly. Each wall element, otherwise referred to as a furniture "base," may be made of a particle foam, which includes for example and without limitation EPP foam. Other particle foams may be made from other materials, including for example various corn starches. The wall elements may be configured with an interior space 44 formed therein, for example along a bottom of the wall element as shown in FIG. 3. Referring to FIG. 1, adjacent wall elements may be joined by one or more connector elements 46, 48. The connector elements are molded plastic in one embodiment, and include a pair of downwardly extending projections 52 that are received in openings 56 formed in the adjacent wall elements. The connector further includes an upwardly extending grippable portion 58, or handle, which may be grasped by a user to facilitate installation and extraction of the connector. The connector further includes a septum 54 extending downwardly between the projections. The septum helps to locate the connector relative to the wall elements. The septum keeps the connector from twisting relative to the wall elements. The septum may be omitted in various embodiments. In one embodiment, a pair of connectors 48 joins adjacent wall elements in the uppermost and lowermost channels, although it should be understood that a connector may also be installed in an intermediate, or middle channel. A bottom connector 46 may include a pair of upwardly extending posts that engage openings in adjacent wall elements.

In one embodiment, the geometrical shape of each wall element 4, 6, 8, 10, 12 is defined by a core 68 composed of a solid material as shown in FIG. 3. In one embodiment, the core material is homogenous, meaning the core is made of the same material, from one side of the element to the other, and defines for example exterior, visible surfaces of the side walls 14, 16, 18, 20 and channels and the end surfaces 28, 30, 32, 34, 36, 38, 40, 42 of the wall elements, free of any further covering or layer of material. In one embodiment, the upper exterior surfaces, e.g., the tops of all the wall elements and bottoms of the channels, and lower exterior surface 70, i.e. bottom of the wall elements, are likewise defined by the same core material. In some embodiments, the entire thickness, width and/or height of the core 68 may be configured of a solid material. In other embodiments, various voids 44 may be formed internally, for example to provide for attachment of various accessory components, or in order to reduce the overall weight of the element. By means of such a formation of the individual wall elements to be in one piece, and one homogenous material, the wall elements do not have to be assembled from individual components in a laborious and time-consuming mariner.

It should be understood that in other embodiments, the exterior surface of the core 68 may be covered, for example by the application of a coating. A finished wall element of this type then consists of a core defining the geometrical shape and of a shell by means of which the wall element can be matched in the composition of the surface thereof and/or the appearance thereof to the individual requirements.

In one embodiment, the core 68 is made of a rigid foam material. For example, in one embodiment, the core is made an expandable polystyrene (EPS) which has in particular a volume weight of approximately 20 kg/m$^3$ to 70 kg/m$^3$ and in particular approximately 40 kg/m$^3$. In another embodiment, the solid core 68 material is formed from a particle foam, and in particular an expanded polypropylene (EPP) foam which has a volume weight of approximately 20 kg/m$^3$ to 70 kg/m$^3$ and in particular approximately 40 kg/m$^3$. In comparison to wall elements produced, for example, from wooden panels, the individual wall elements have a low weight which simplifies in particular transportation, locally on site, or globally from the manufacturing facility. Furthermore, by means of the use of materials of this type, the wall elements have heat-insulating and sound-absorbing properties and therefore permit effective protection of the delimited work place from drafts and sound. In the case of expanded materials, the wall elements can simply be adapted to various requirements, such as, for example, stability and loadbearing capacity, by changing the volume weight.

The EPP foam is formed from polypropylene beads or pearls that are fused by steam during the molding process. In one embodiment, the EPP beads have a bulk density (measured as a loose fill) of about 45 g/l. During the molding process, the material will mold to about 60 g/l. The bead has a diameter of about 3.0 mm. Suitable beads may have a diameter between about 2.0 mm and about 5.0 mm. Suitable beads may have a bead bulk density of between about 20 g/l to about 90 g/l. To achieve a class-A appearance, the exterior surface must mask or disguise both the pearl structure of the EPP beads and also the vent interfacings that are left by vent holes 82 in a molding tool 80, shown in FIGS. 3-6D. As mentioned, the visible exterior surfaces of the wall elements, and in particular the core, are defined as the outermost surfaces that are visible to a user.

In one embodiment, the visible exterior surfaces are formed by an EPP foam having a textured appearance with a matte finish. In one embodiment, the textured surface is a crepe 300-0 texture. In an exemplary embodiment, the exterior surface has a nominal roughness depth of less than or equal to 0.5 mm and a plurality of vent interfaces each having a maximum width of less than or equal to 0.4 mm. Due to the size and interfacing of the EPP pearls, the overall surface may have various gaps, with a maximum depth from peak to valley being about 1.0 mm. The term "vent interface" refers to the mark made on the visible exterior surface by the vent holes 82 from the mold. The vent interfaces 86 are generally not visible to the naked eye of the user, although present on the exterior surface, and are therefore referred to generally in the drawings as being distributed on the exterior surface of the wall elements. In various embodiments, the roughness depth of the exterior surface is less than or equal to 0.4 mm. In various embodiments, the vent interfaces 86 are circular and have a diameter of less than or equal to 0.4 mm. It should be understood, however, that the vent interfaces, and corresponding vent holes, may be configured in other shapes, including various elliptical, obround, and polygonal shapes, all limited by a maximum dimension, defined as a width of the opening.

Due to the combination of the textured finish of the visible exterior surface and the size of the vent interfaces, the exterior surface disguises both the interfaces and the pearl structure of the EPP foam, thereby providing a class-A surface. In essence, a "crepe" finish resembles the result of a natural process such as corrosion, such that the surface does not appear predetermined, but rather is a random texture without repeats within a certain range of roughness or depth. The roughness (refers to size/resolution) and the depth match the EPP bead size in a way and therefore disguises them within the predetermined finish. The texture disguises the beads (reproduction of texture depth and geometry) and leads to a matte finish (reproduction of every little peak which refracts the light). As explained below, a combination of two etched textures, one on top of the other, enlarges/increases the resolution of the texture. A matte finish results from the resolution (amount per area) of peaks which refract light. The more peaks that are present within the texture provide a better matte finish.

Figure 6A:
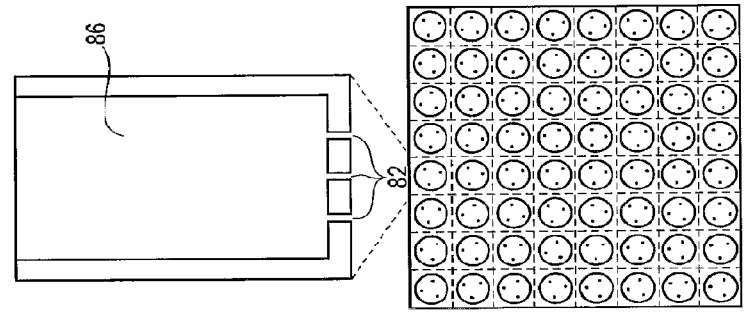
FIGS. 6A-6D show various vent hole arrangements.
Figure 6B:
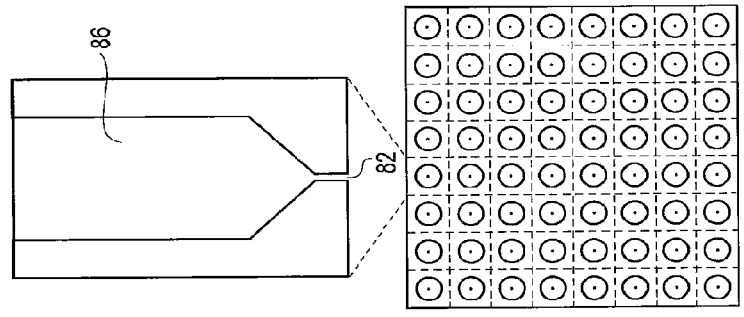
Figure 6C:
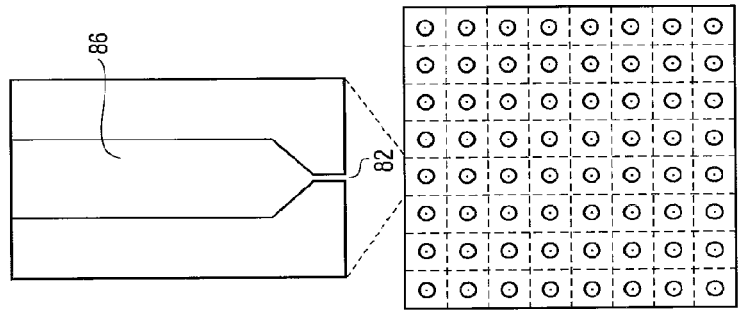
Figure 6D:
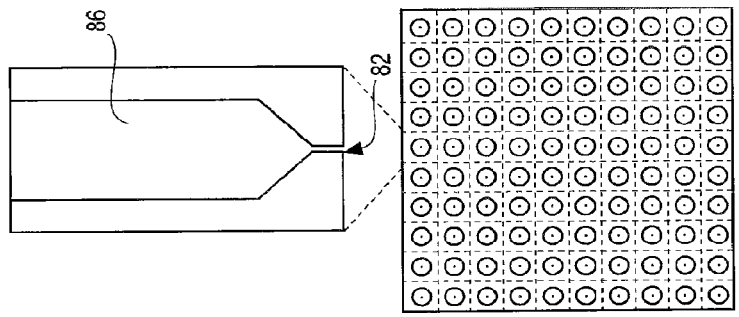
Figure 7:
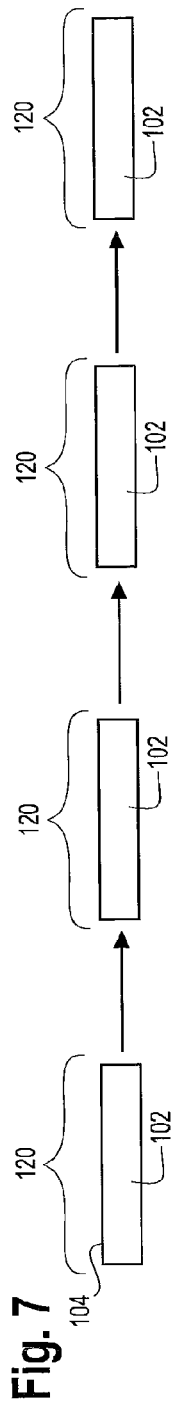
FIG. 7 is a schematic showing the process of making a mold component.

In one embodiment, the plurality of vent interfaces 86 are distributed with a density of one vent interface 86 per 100 mm$^2$ of surface area or less, as shown in FIG. 6D. Also in one embodiment, the expanded polypropylene foam is formed from polypropylene beads having a pearl size of less than or equal to 5.00 mm, and preferably about 3.00 mm.

As discussed above, the visible exterior surface having a class-A finish may be formed as only one of the surfaces of the wall elements, or may be formed as a pair of opposite visible side exterior surfaces, for example the opposite side surfaces. The wall elements may be further formed with class-A visible surfaces on the upper and lower visible exterior surface, and/or also on the end surfaces. While the molded element has been disclosed as a partition wall, it should be understood that other molded components, including various automotive components, other furniture elements such as a bench or chair, electronic housings, home and office devices, luggage and various storage devices, and any other component capable of being made of EPP may be formed with such a class-A visible exterior surface.

As shown in FIG. 1, the partition wall element may be configured with an in-molded accessory interface 90, such as a metal base or stanchion receiving tube.

Mold

Referring to FIGS. 3, 4 and 8A-F, a mold 100 for molding particle foam, including expanded polypropylene foam, includes at least one mold component 102, 112, 114, 116, 202, 204 defining at least in part a mold interior. The mold component includes at least one textured molding surface 104 defining at least in part the mold interior 106. In one embodiment, the textured molding surface 104 has a roughness depth of less than or equal to 0.5 mm and a plurality of vents 82, otherwise referred to as vent holes, each having a maximum width of less than or equal to 0.4 mm. As noted above, the vents 82 may be circular, having a diameter of 0.4 mm, or may be otherwise shaped. In one embodiment, the roughness depth may be less than or equal to 0.4 mm. The plurality of vents 82 are distributed with a density of one vent per 100 mm$^2$ of surface area or less as shown in FIG. 6B-D. The texture of the mold interior may be configured with a "crepe" finish. A far side of the vent hole is formed as a passageway 86 with a tapered end portion feeding the vents. The passageway 86 having a diameter ranging from 4 mm, to 4.8 mm to 6 mm, as shown in FIGS. 6B-6D. In another embodiment, shown in FIG. 6A, a plurality of vents 82, shown as three, are distributed in each 100 mm$^2$ of surface area. In this embodiment, a single passageway 86, having an exemplary diameter of 8 mm, feeds the plurality of vents 82. The passageway in this embodiment is not tapered adjacent the vents.

In one embodiment, the mold includes a pair of opposing textured side molding surfaces 104, 118 defining at least in part the mold interior therebetween, and may further include an upper and lower textured molding surfaces 108, 110 and opposite end textured molding surfaces 201, 203 further defining said mold interior 106. In this way, the entirety of the molded component, i.e., the core 68, may be provided with a class-A exterior surface. To accommodate large components, for example and without limitation the disclosed wall elements, the mold interior 106 may be configured with a volume of 1800 mm×1240 mm×1000 mm, or less, including a reduction in any of the dimensional parameters. In one embodiment, the mold interior defines an exterior shape of a partition wall, although it should be understood that the mold interior may define any type of molded component suitably made of EPP or other particle foam.

As shown in FIGS. 3, 8A-F, 9 and 10A-C, one embodiment of the mold includes three pairs of mold components, including a pair of side mold components 102, 112, upper and lower mold components 114, 116, and a pair of end mold components 202, 204. The mold components 102, 112, 114, 116, 202, 204 are moved together to define the mold interior 106. The mold components each include a mold plate 120, 122, 124, 126 defining the textured molding surface. The mold plates may be reinforced with a backing structure 128, such as ribs or bars due to the relatively large size of the molding surfaces. Each mold plate is configured with vent holes 82 having the size and density referred to above. The placement of the vent holes 82 may be random, may be configured in an array, or may be positioned so as to be collocated with a valley, or depression in the textured mold surface. The vent holes include a back side inlet passageway 86 as explained above. As described, an end portion of the inlet passageway tapers to the vent hole.

One or both of the upper and lower mold components 114, 116 are moved toward and away from each other with actuators 130, 132, shown for example and without limitation as hydraulic or pneumatic cylinders. Likewise, one or both of the opposite side mold components 112, 102 may be moved toward and away from each other with actuators 134, 136. One or both of the end mold components 202, 204 also are moveable toward and away from each other.

An EPP bead supply line 138 communicates with the mold interior and fills the mold interior with EPP beads. Each mold plate communicates with a steam supply, with steam being supplied to the mold interior through the vent holes 82. In one embodiment, the cavity is filled from the top which may correspond to the bottom of the molded component. Three steam circuits are provided with this mold, as further explained below.

Method of Making a Mold for Molding an EPP Component

Referring to FIGS. 3-7, a method of making a mold for molding a particle foam, including expanded polypropylene foam, includes providing at least one mold component 102 defining at least one molding surface. In one embodiment, a pair of mold components define opposite, facing molding surfaces. In yet another embodiment, the mold components define side, upper and lower, and opposite end mold surfaces. It should be understood that the terms end, side, upper, top, bottom, and lower do not necessarily refer to planar or linear surfaces, but rather general directions or orientation, such that both a cubic and a spherical structure could have opposite sides, and upper and lower surfaces.

The mold surfaces 104 are treated such that the molding surface have a roughness depth of less than or equal to 0.5 mm, and may be less than or equal to 0.4 mm. In one embodiment, the molding surface is etched. The treating may include etching the molding surface a first time 120 with a film (see FIG. 5) and etching the molding surface a second time 122 with an etching fluid or another film. The etching may include laser etching or engraving the surface. The treating may further include sand-blasting 124 the molding surface after etching the molding surface the second time. The etching and sandblasting, alone or in combination, achieve the desired surface roughness and texture, for example a crepe finish.

The method further includes drilling vent holes 126 through the mold component 102, e.g., a mold plate, with the vents communicating with the molding surface. In one embodiment, the vent holes have a maximum width of less than or equal to 0.4 mm. The vent holes 82 may be drilled with conventional machining or by laser drilling. The holes are drilled by distributing the vent holes in the mold component with a density of one vent hole per 100 $mm^2$ of surface area of the mold surface or less.

In various embodiments, the molding surface 102 or surfaces defines at least in part a mold interior 106. As noted, the mold interior may have a volume of 1800 mm×1240 mm×1000 mm. Of course, the mold interior may have lesser dimensions in each direction. In one embodiment, the molding surface or surfaces define at least in part a mold interior defining an exterior shape of a partition wall.

Method of Making a Molded Particle Foam Component

Referring to FIGS. 3 and 8A-12L, a method of molding a molded particle foam component, including an EPP component, includes introducing beads of the particle foam, such as polypropylene foam 150 into a mold interior 168. The beads may have a bulk density (measured as a loose fill) of about 45 g/l. During the molding process, the material will mold to about 60 g/l. The bead has a diameter of about 3.0 mm. Suitable beads may have a diameter between about 2.0 mm and about 5.0 mm. Suitable beads may have a bead bulk density of between about 20 g/l to about 90 g/l. The mold has at least one textured molding surface 104, 118, 108,110 defining at least in part the mold interior. The molding surfaces have a roughness depth of less than or equal to 0.5 mm, and in one embodiment, a roughness depth of less than or equal to 0.4 mm.

A plurality of vents 82 each having a maximum width of less than or equal to 0.4 mm communicate with the interior molding surfaces 104, 108, 110, 118, 201, 203. In one embodiment, the plurality of vents, and corresponding interfaces 86 are distributed with a density of one vent or vent interface per 100 $mm^2$ of surface area or less.

Figure 10A:
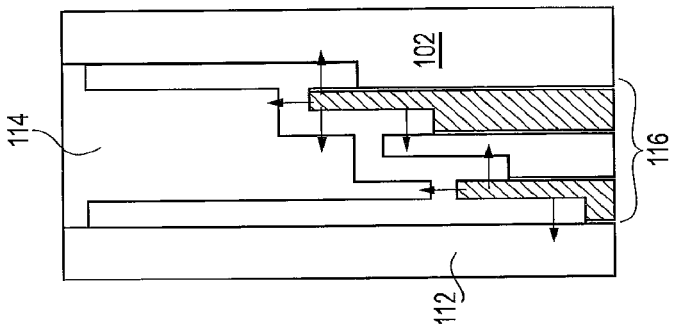
FIGS. 10A-C show different phases of the molding process using the mold shown in FIG. 9.
Figure 9:
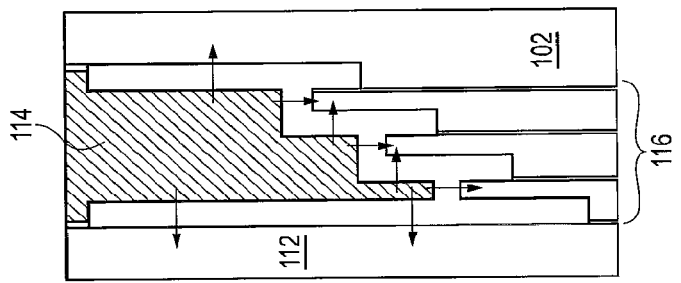
FIG. 9 is a side schematic view of one embodiment of mold.
Figure 10B:
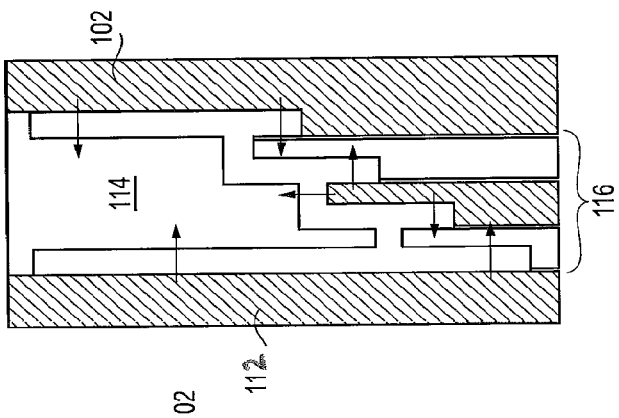
Figure 10C:
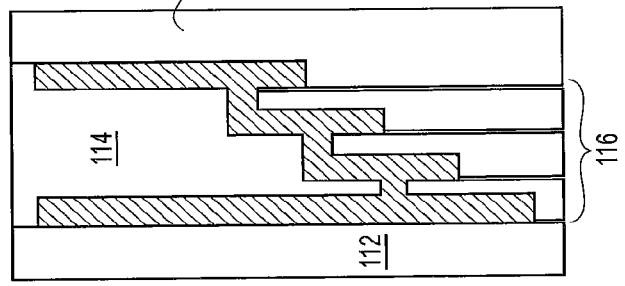
Figure 11:
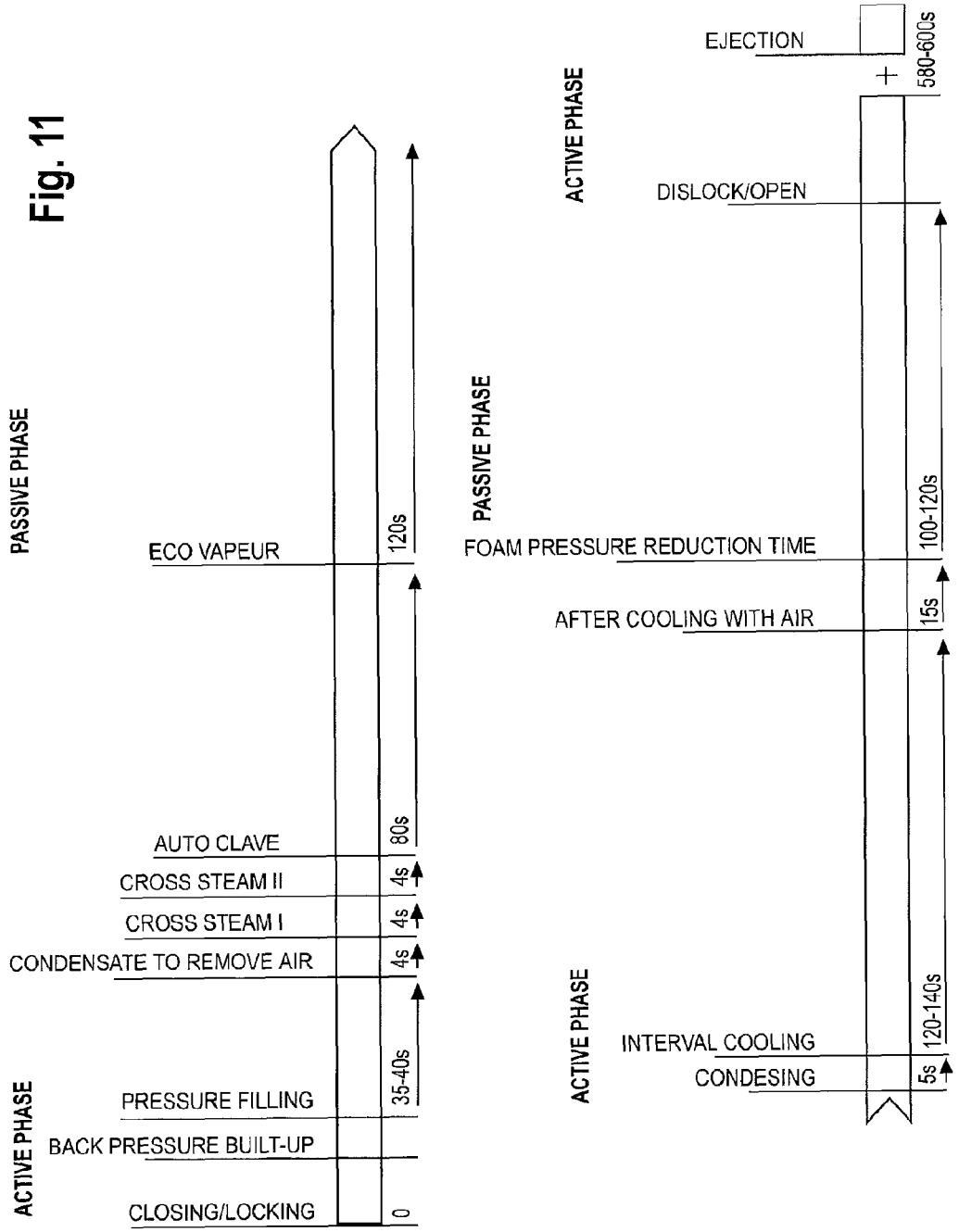
FIG. 11 is a flow diagram of the molding process.
Figure 12A:
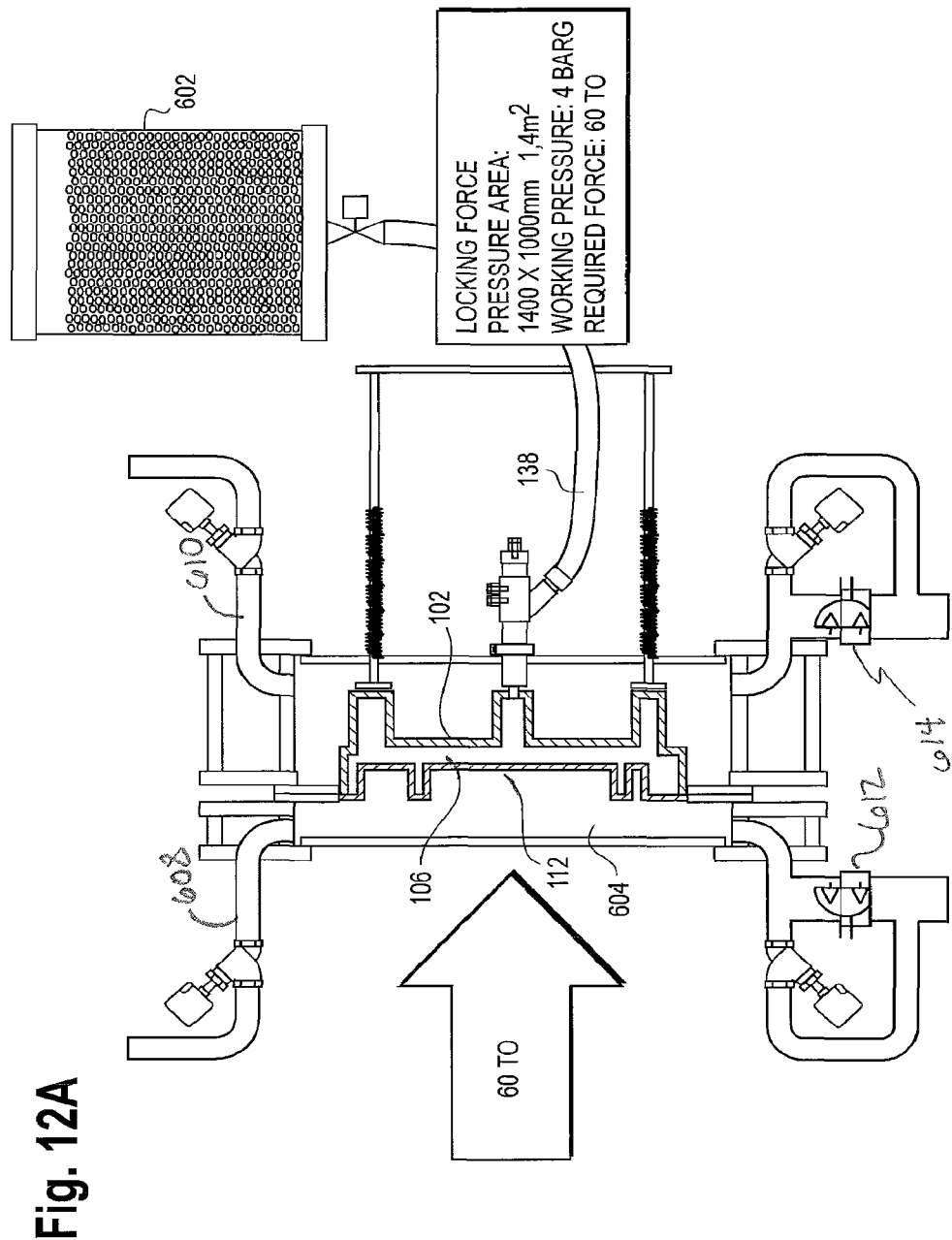
Figure 12B:
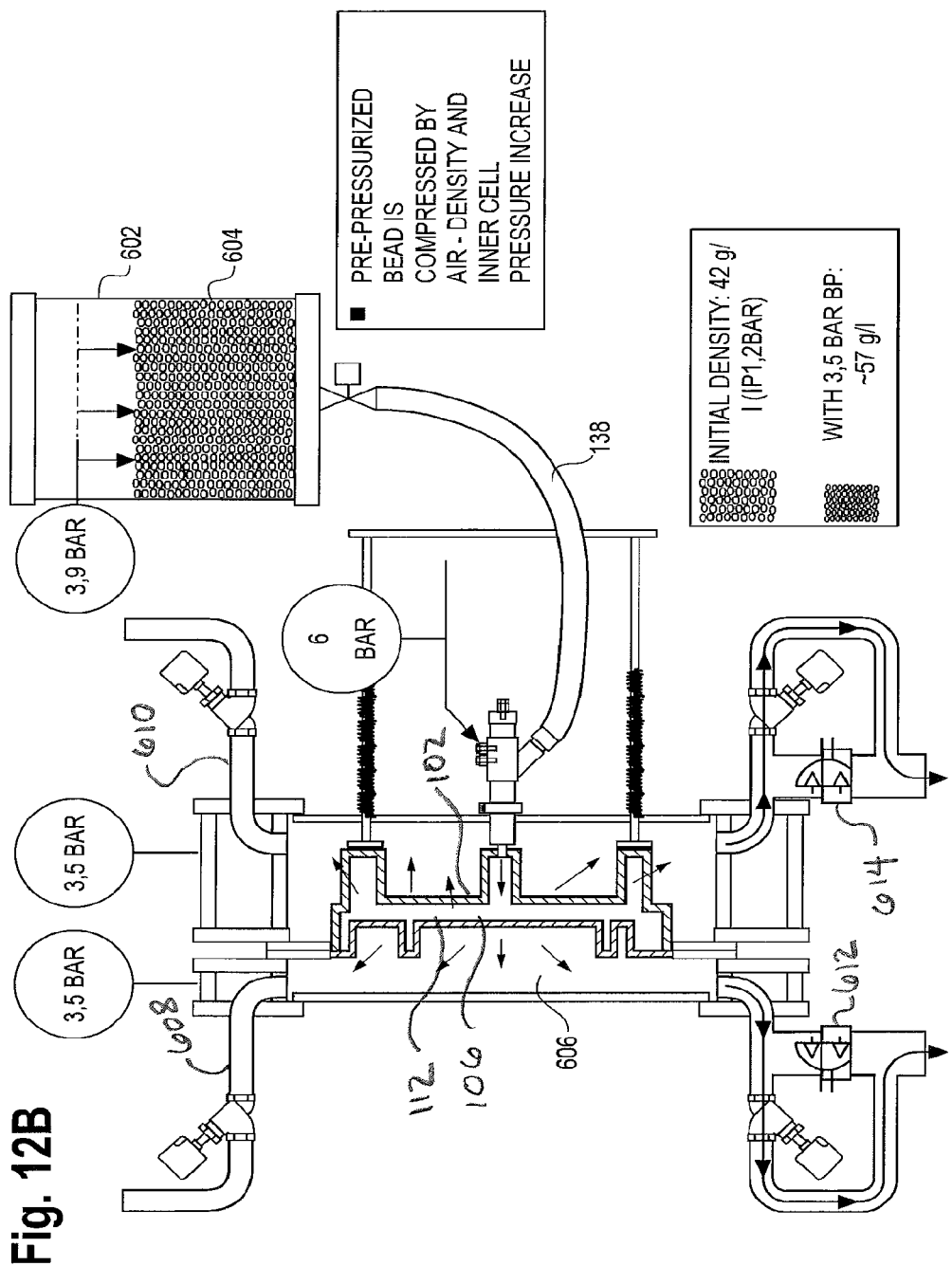
Figure 12D:
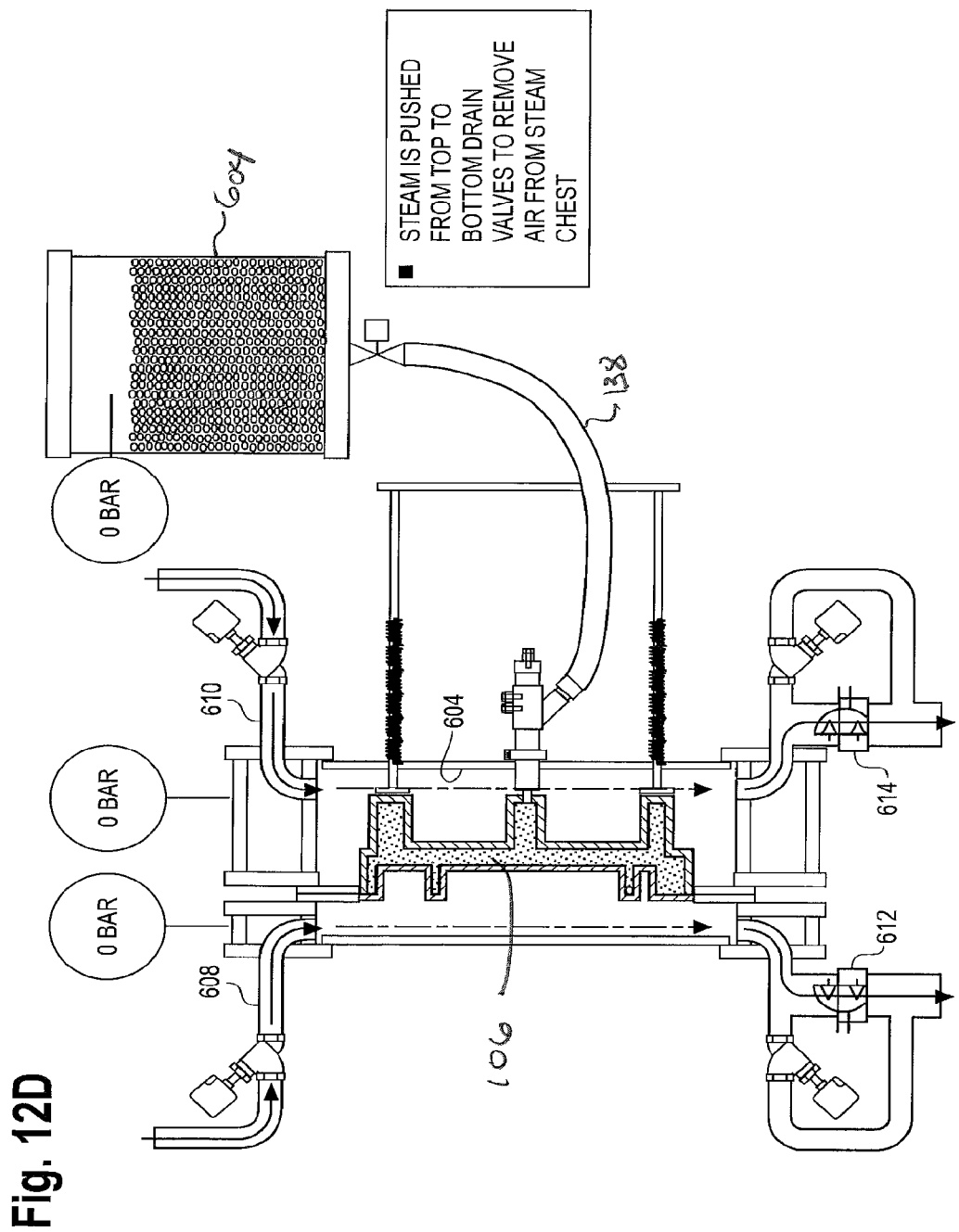
Figure 12E:
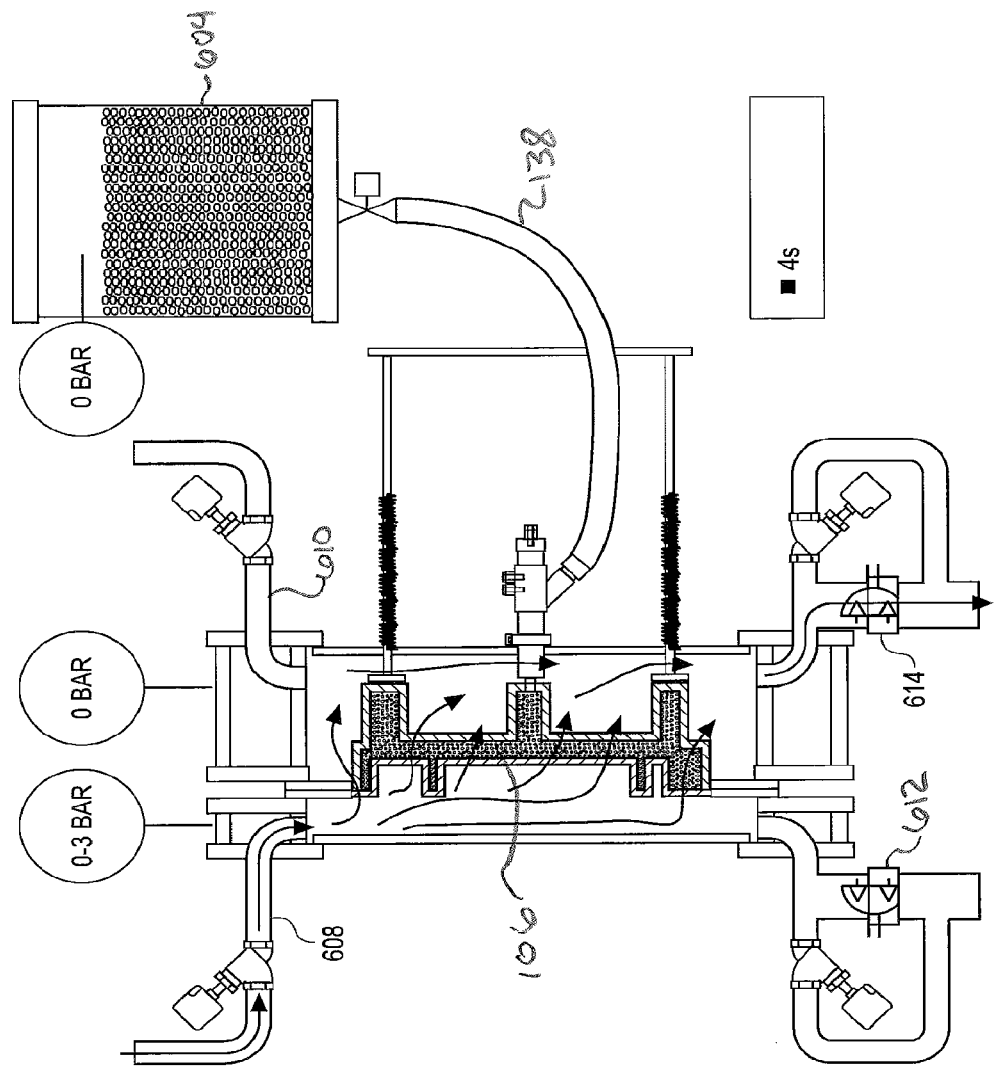
Figure 12F:
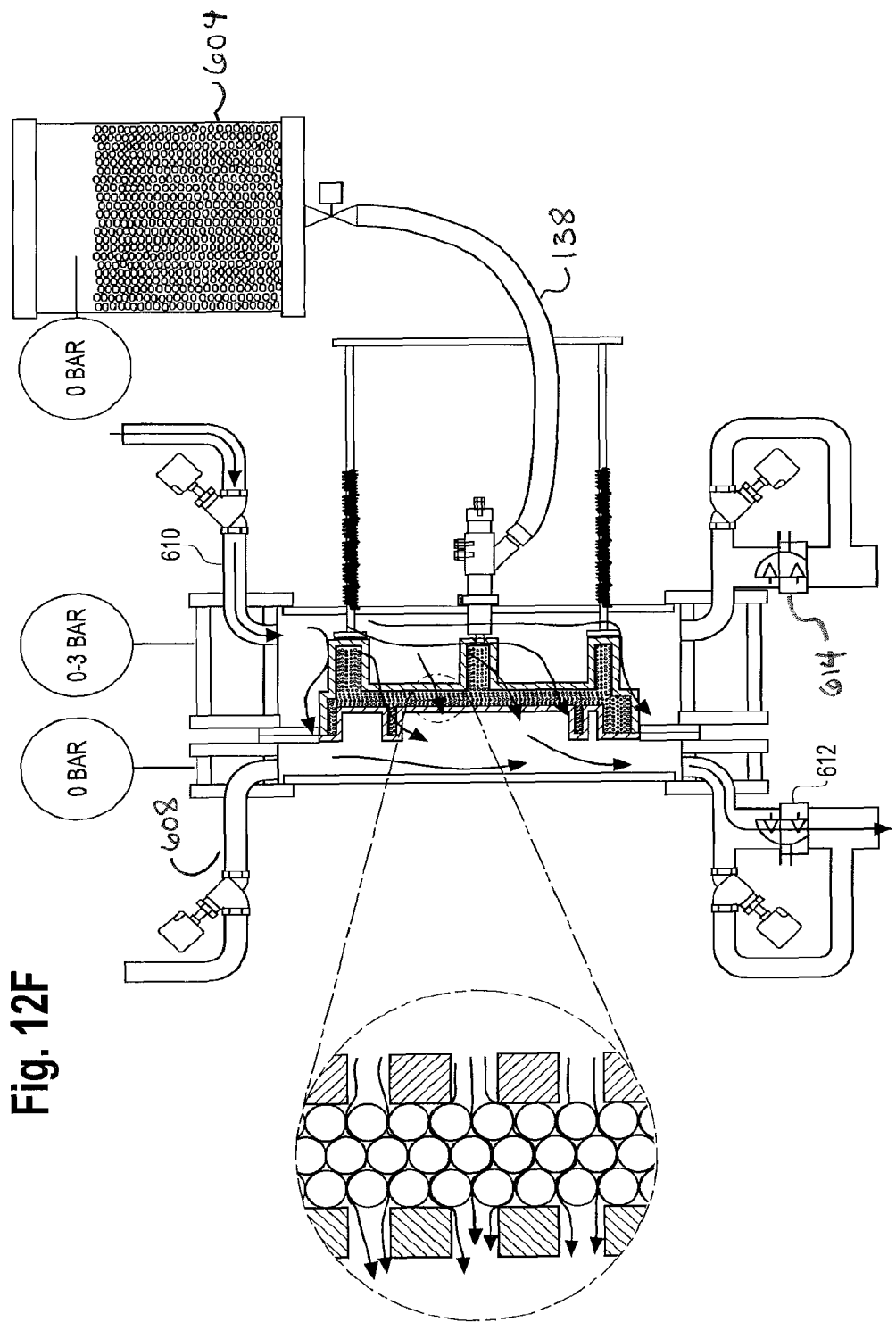
Figure 12H:
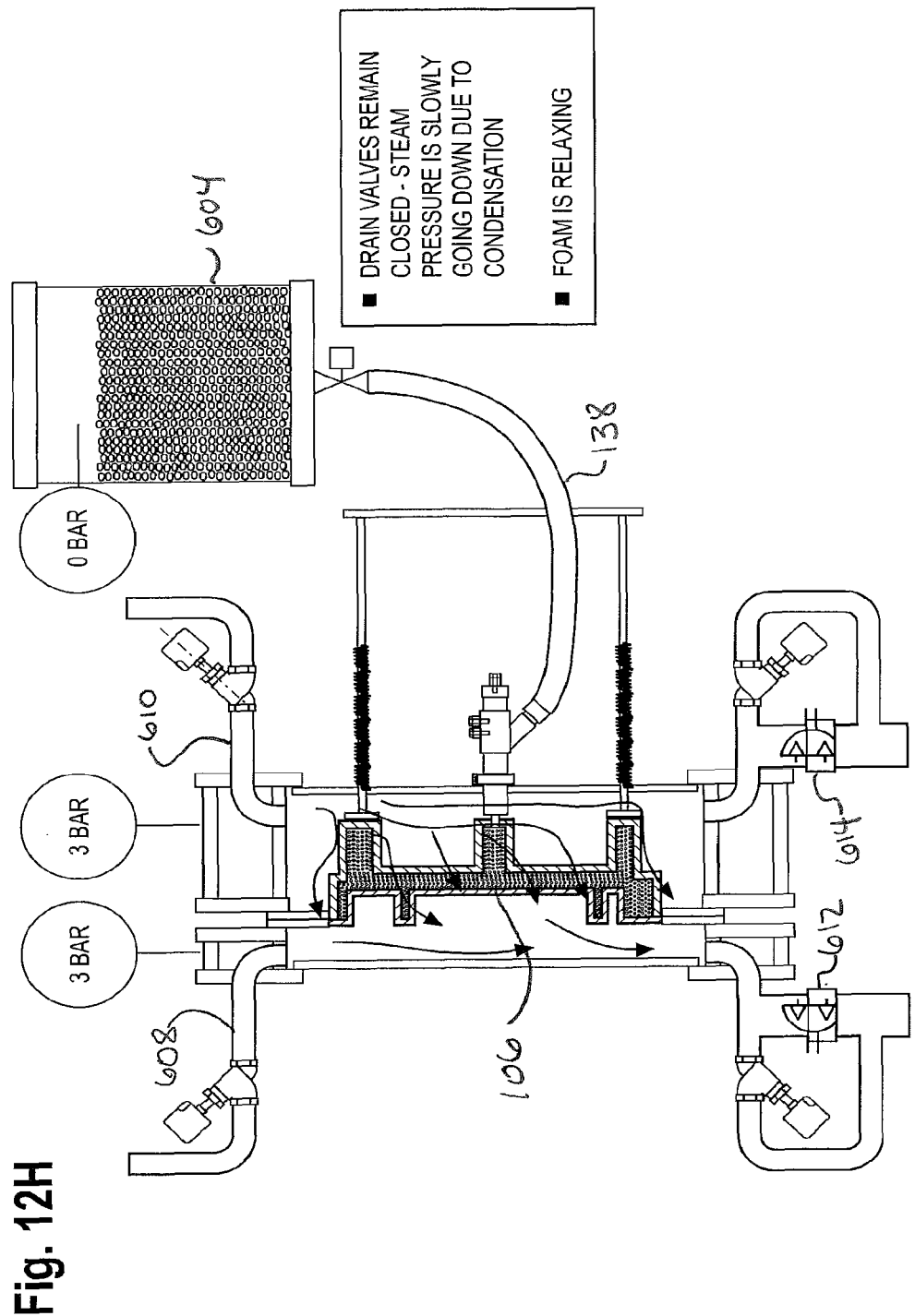
Figure 12I:
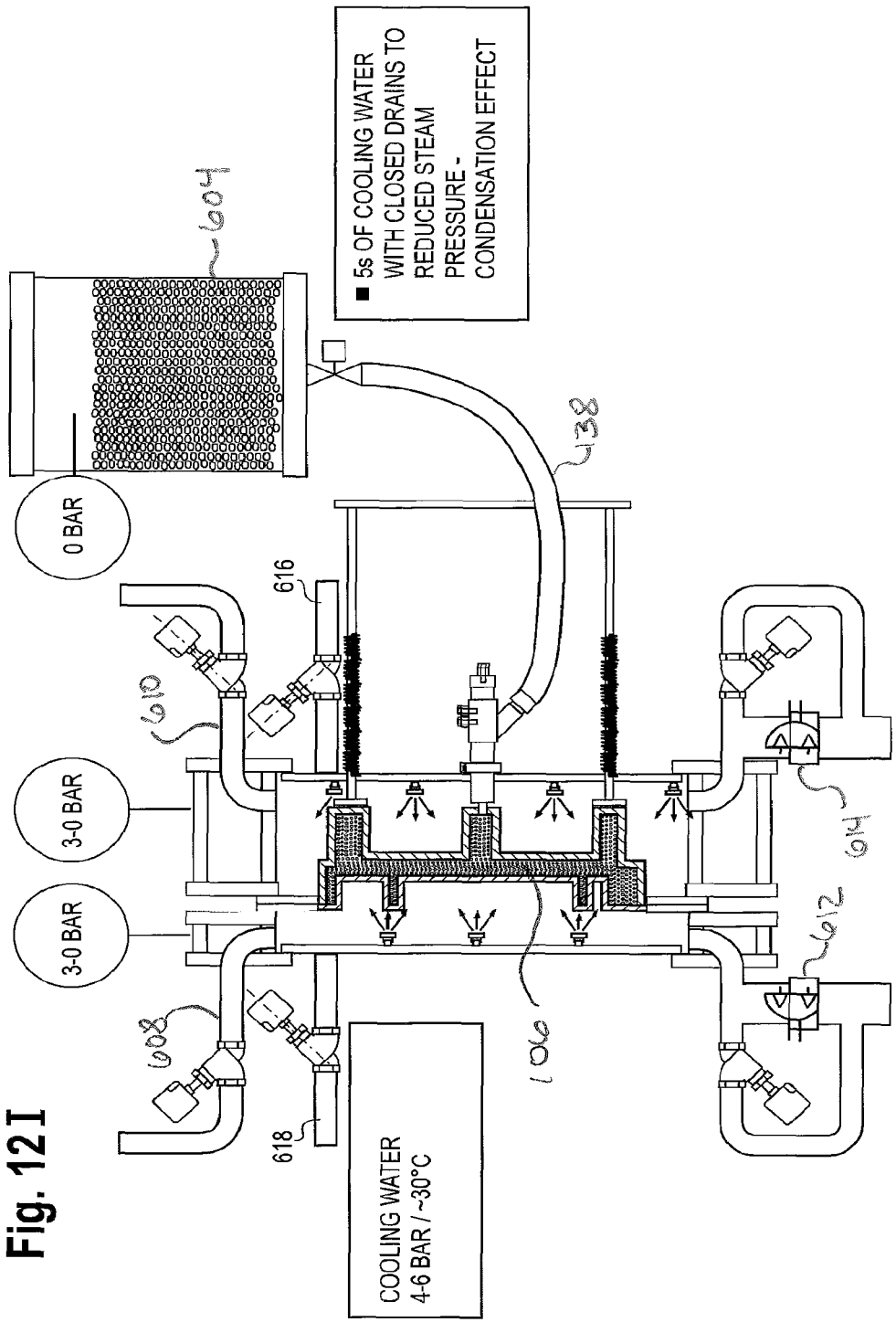
Figure 12J:
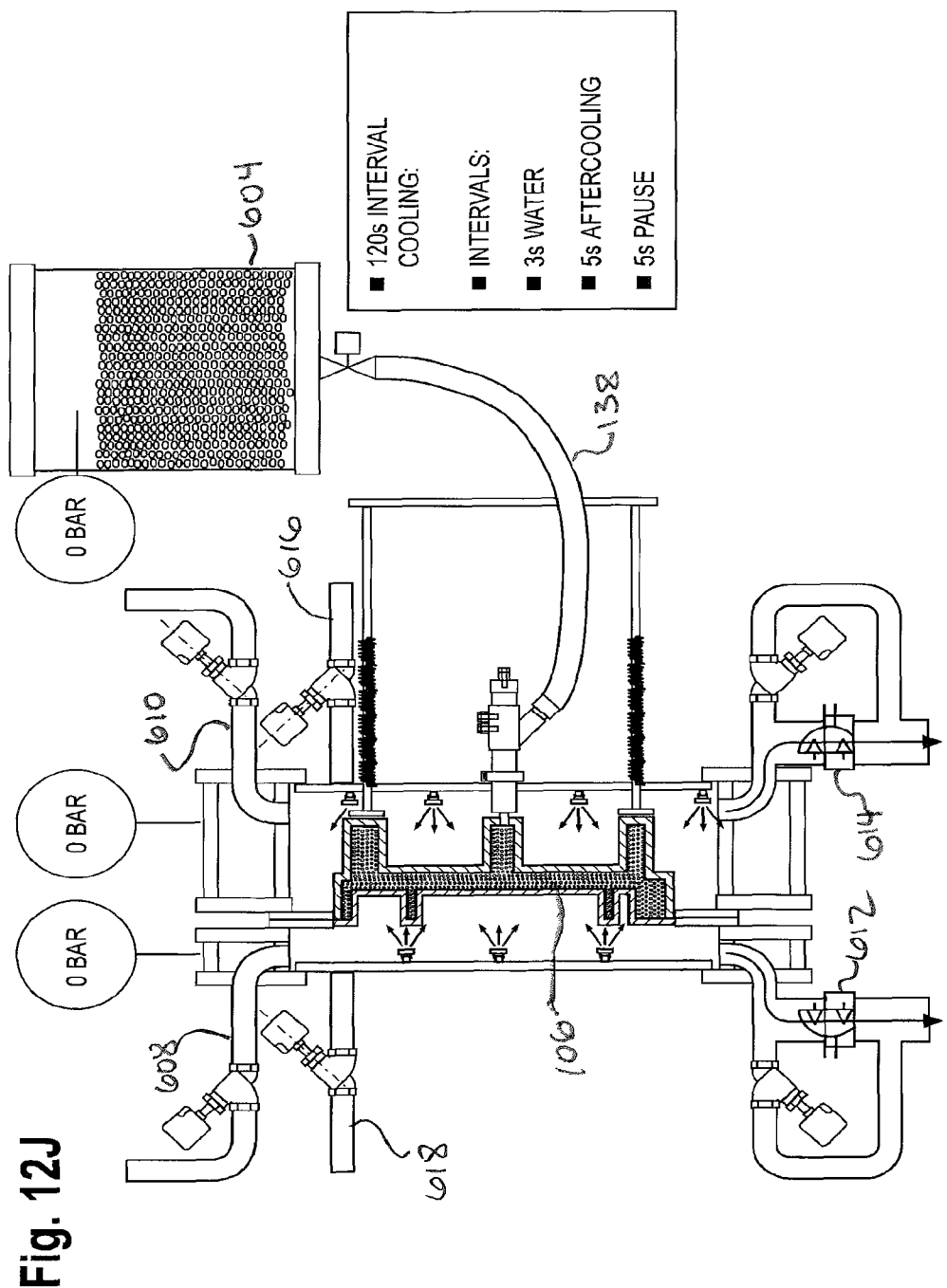
Figure 12K:
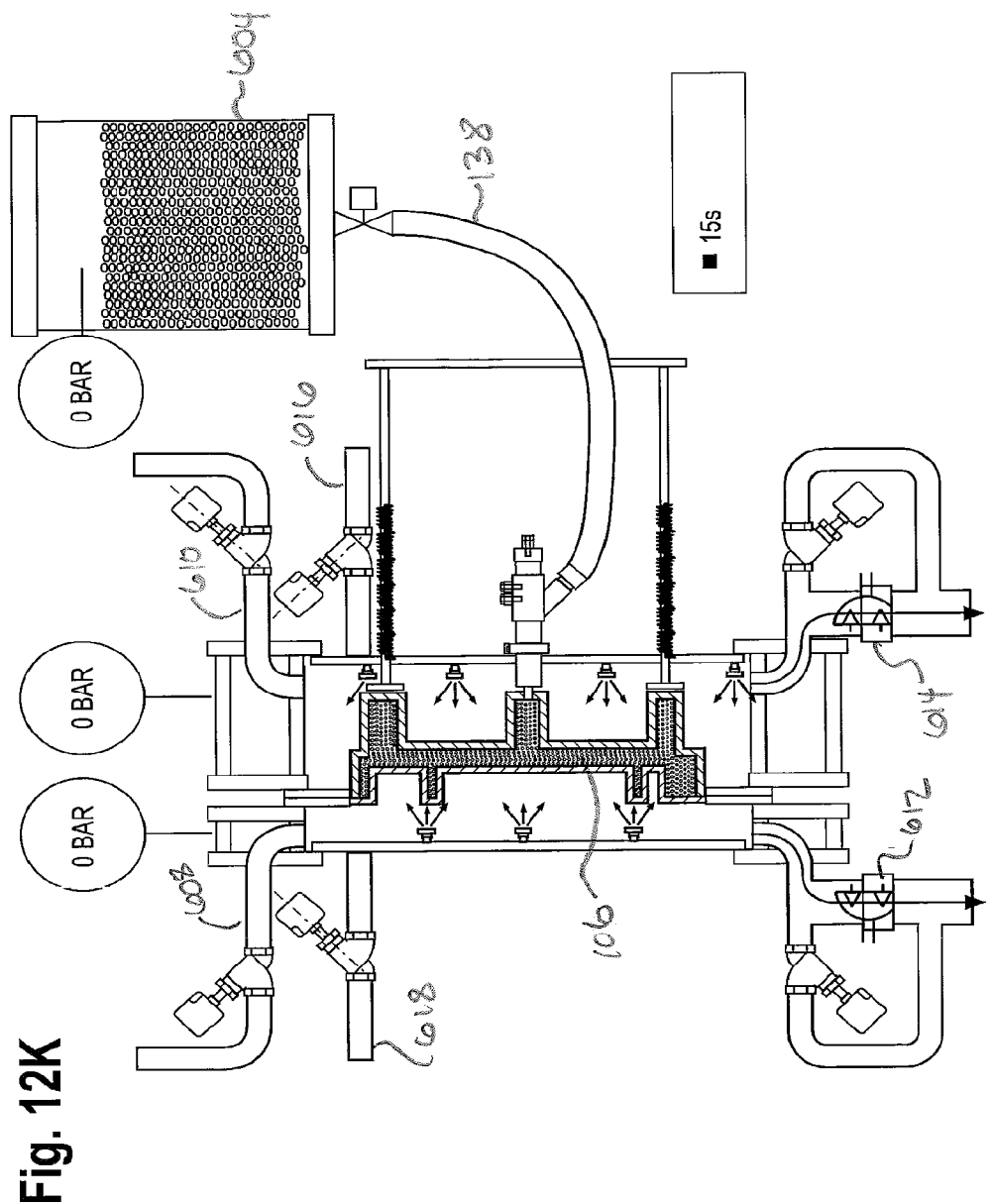
Figure 12L:
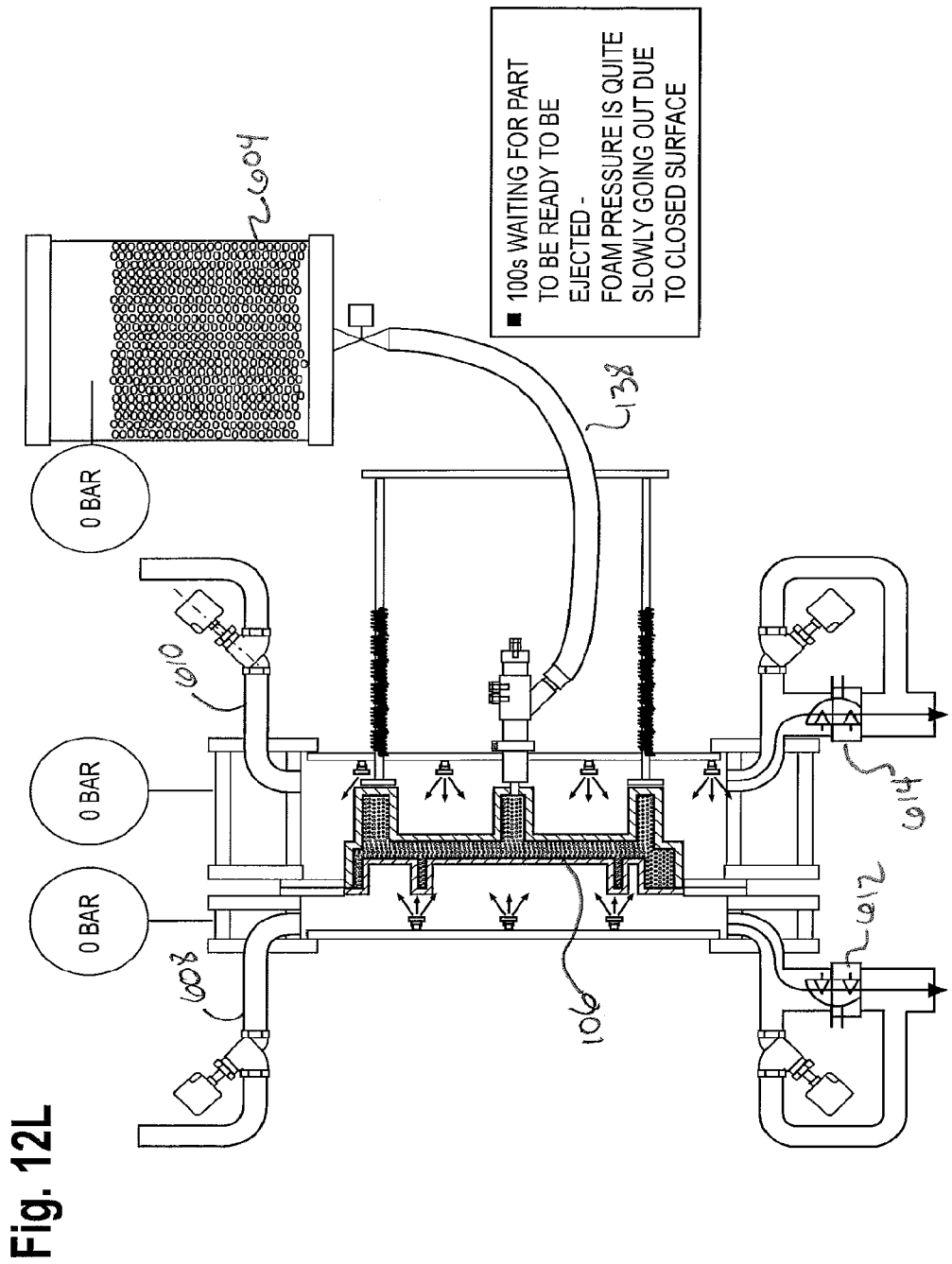

In a first step of the process (FIG. 12A), the mold components 102, 112, 114, 116, 202, 204 are moved together to define the mold interior 106. Next (FIG. 12B), the supply 604 of beads are pre-pressurized in a container 602, for example at a pressure of about 3.9 bar, or 390 kPa. In other embodiments, the pressure may range from about 2 bar to about 4.5 bar. In one embodiment, the initial density if about 42 g/l (1 pa, 2 bar), with the density being about 57 g/l at 3.5 bar. In other embodiments, suitable bead bulk densities are between about 20 g/l to about 90 g/l. The chest 604 is back-pressurized to about 3.5 bar (350 kPa). In other embodiments, the pressure may range from about 1.5 bar to about 4.5 bar. Next (FIG. 12C), the beads are allowed to flow into the interior 106, with a pressure differential of about 0.4 bar between the container and the mold interior 106. In other embodiments, the pressure differential may range from about 0.1 bar to about 1.5 bar. This process may be accomplished in about 35-40 s. In the next step (FIG. 12D), steam is introduced through lines 608, 610 feeding opposite sides of the chamber 604, with the steam being pushed from the top to bottom drain valves 612, 614 to move air from both sides of the steam chest 604, taking about 4 s. Referring to FIGS. 12E and 10A, a first cross steam flow through the mold interior is performed to ensure inner fusion of the beads, with an elapsed time of about 4-5 s. The flow comes from supply line 608 at a pressure of between about 0 and 3 bar. As shown, the flow exits through a first drain valve 614. Referring to FIGS. 12F and 10B, a second cross steam flow in an opposite direction through the mold interior is performed, again with an elapsed time of about 4-5 s. The flow comes from supply line 610 and exits through an opposite second drain valve 612, again at a pressure of about 0 to 3 bar. Referring to FIG. 10C, an alternative third cross steam flow may also be performed. Referring to FIG. 12G, an autoclave step is performed, with the drain valves 612, 614 closed and steam supplied by lines 608, 610 at a pressure of about 3.5 bar. In other embodiments, the pressure may range from about 2 bar to about 4 bar. The temperature in the cavity remains elevated, for example at about 147 degrees C. In other embodiments, the temperature may range from about 100 degrees C. to 200 degrees C. The valves remain closed for about 80 s, although other embodiments include periods of between about 10 s and about 120 s. During this period, the pressure is released from the inside of the foam. In the next step (FIG. 12H), the drain valves 612, 614 remain closed, with the steam pressure slowly diminishing due to condensation, with the foam relaxing. In a condensation phase, lasting about 5 s in one embodiment, cooling water at a pressure of about 4-6 bar and 30 degrees C. is introduced through lines 616, 618 with the drain valves 612, 614 remaining closed to reduce the steam pressure through condensation. Referring to FIG. 12J, interval cooling is then performed for 120 s (range of from about 10 s to 200 s), with intervals of 3 s of water, 5 s aftercooling and 5 s pause, each of which intervals may be 1-10 s in various embodiments. During this phase, water is supplied through lines 616, 618, with the drain valves 612, 614 being opened. Referring to FIG. 12K, additional air aftercooling is performed for a period of about 15 s. A final passive phase of foam pressure reduction is undertaken as shown in FIG. 12L, lasting about 100 s.

Referring to FIGS. 8A-F, the molded component is then ejected. In one embodiment, the end mold components 202, 204 (FIG. 8B) are first moved outwardly, for example a travel of about 12 mm, with a lower mold component 116 then being moved downwardly (FIG. 8C), for example a travel of about 160 mm, the side mold component 102 and molded component moving outwardly (FIG. 8D) from mold component 112, for example a travel of about 400 mm, the mold component 102 moving away from the molded component (FIG. 8E), for example a travel of about 60 mm, and the molded component moving downwardly from the upper mold component 114 (FIG. 8F) and being ejected, whether manually mechanically or by pneumatically by pressurized air.

During the cross-steaming and autoclave steps, the method includes introducing steam 160 into the mold interior 106 through the plurality of vents 82 for a predetermined period of time. In response to the introduction of the steam, the method further includes fusing the beads 150 of polypropylene foam together with the steam and thereby forming the molded element 68.

In one embodiment, the mold includes at least a pair of opposing textured molding surfaces 104, 118 defining at least in part the mold interior 106 therebetween. In another embodiment, the mold further includes at least an upper and lower textured molding surfaces 114, 116 further defining the mold interior 106, and also end textured molding surfaces.

The molded element 68 may be configured as a partition wall, or as any other molded EPP component. The molded component may include an in-molded component, such as an accessory interface 90, handle or other member. The in-molded component is positioned in the mold interior, with the EPP foam beads flowing around the in-molded component, and expanding thereagainst.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A molded component comprising:
an element molded from a particle foam, said element comprising at least one visible exterior surface defined by said particle foam, wherein said visible exterior surface includes a class-A surface texture having a roughness depth of less than or equal to 1.0 mm and a plurality of vent interfaces each having a maximum width of less than or equal to 0.4 mm.

2. The molded component of claim 1 wherein said particle foam comprises an expanded polypropylene foam.

3. The molded component of claim 2 wherein said roughness depth is less than or equal to about 0.5 mm.

4. The molded component of claim 2 wherein said plurality of vent interfaces are distributed with a density of one vent interface per 100 mm$^2$ of surface area or less.

5. The molded component of claim 2 wherein said expanded polypropylene foam is formed from polypropylene beads having a pearl size of less than or equal to 5.0 mm.

6. The molded component of claim 2 wherein said at least one visible exterior surface comprises a pair of opposite visible side exterior surfaces.

7. The molded component of claim 6 wherein said at least one visible exterior surface further comprises an upper and lower visible exterior surface.

8. The molded component of claim 2 wherein said element comprises a partition wall.

9. The molded component of claim 8 wherein said partition wall comprises an in-molded accessory interface.

10. The molded component of claim 2 wherein said roughness depth is less than or equal to 0.4 mm.

11. The molded component of claim 2 wherein said expanded polypropylene foam is formed from polypropylene beads having a bulk density of less than or equal to 90 g/l.

12. The molded component of claim 2 wherein said vent interfaces are circular and have a diameter of less than or equal to 0.4 mm.

13. A partition system comprising:
a wall element molded from a particle foam comprising at least one visible exterior surface defined by said particle foam, wherein said visible exterior surface includes a class-A texture having a roughness depth of less than or equal to 1.0 mm and a plurality of vent interfaces each having a maximum width of less than or equal to 0.4 mm.

14. The partition system of claim 13, wherein said class-A texture includes a crepe texture.

15. The partition system of claim 13, wherein said wall element is curved.

16. The partition system of claim 13, further comprising a plurality of additional wall elements connected together.

17. A partition system comprising:
a wall element molded from a particle foam comprising at least one visible exterior class-A surface defined by said particle foam, wherein said visible exterior surface includes a plurality of vent interfaces having a maximum width of less than or equal to 0.4 mm and distributed with a density of at least one vent interface per 100 mm$^2$ of surface area or less.

18. The partition system of claim 17, wherein said visible exterior class-A surface includes vent interfaces distributed with a density of three vent interfaces per 100 mm$^2$ of surface area or less.

19. The partition system of claim 17, wherein said visible exterior class-A surface is textured having a roughness depth of less than or equal to 1.0 mm.

20. The partition system of claim 17, wherein said particle foam comprises an expanded polypropylene foam formed from polypropylene beads having a pearl size of less than or equal to 5.0 mm.

* * * * *